Figure 1:
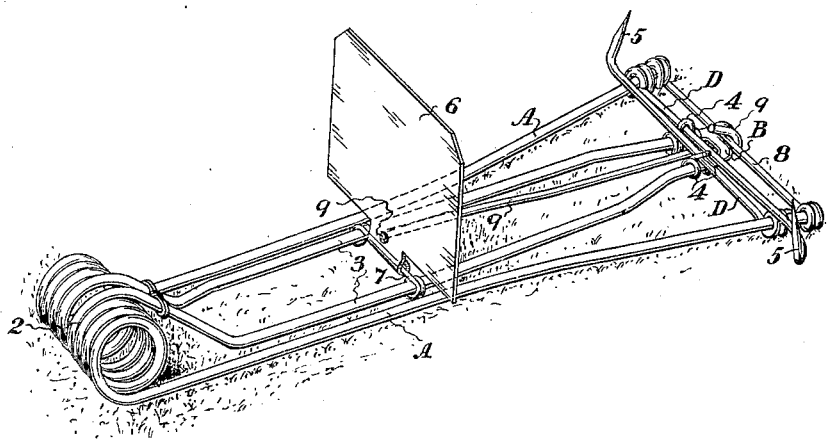
Figure 2:
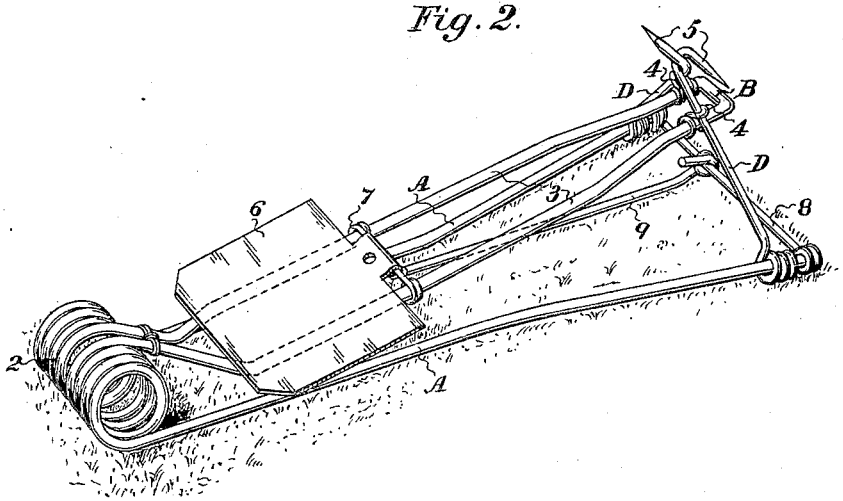

No. 659,932. Patented Oct. 16, 1900.
Z. A. MACABEE.
GOPHER TRAP.
(Application filed June 21, 1900.)

(No Model.)

Witnesses,

Inventor,
Zephyr A Macabee

United States Patent Office.

ZEPHYR A. MACABEE, OF LOS GATOS, CALIFORNIA.

GOPHER-TRAP.

SPECIFICATION forming part of Letters Patent No. 659,932, dated October 16, 1900.

Application filed June 21, 1900. Serial No. 21,051. (No model.)

*To all whom it may concern:*

Be it known that I, ZEPHYR A. MACABEE, a citizen of the United States, residing at Los Gatos, county of Santa Clara, State of California, have invented an Improvement in Gopher-Traps; and I hereby declare the following to be a full, clear, and exact description of the same.

My invention relates to an improved trap which is especially designed for catching gophers and similar burrowing animals.

It consists, essentially, of a spring-frame having transverse pointed interlocking arms at one end, loops through which these arms pass and which when the trap is set by depressing the upper portion will separate the interlocking arms, a plate fulcrumed upon the framework, and a trigger engaging the plate by which the trap is held when set.

The invention also consists of details of construction, which will be more fully explained by reference to the accompanying drawing.

The trap is formed of wire. I have shown it here as made in a single piece of wire forming the base with two converging sides A A, which are coiled from the outside toward the center, at the rear, as shown at 2, to form a stiff coiled spring. Thence the wires, which have been brought together by this coiling process, are diverged or separated and then carried along approximately parallel and inclining upwardly above the base portion, as shown at 3. The bight or connection of wires is at the termination of the sides 3 or the front, as here described. The front separate ends of the base are united by a bar 8, which also forms a fulcrum for the latch or trigger 9. These upwardly-inclined sides 3 are nearer together than the base portion A and have loops or guides 4 attached to them, as shown. Around the ends of the base A and beneath these loops on the part B are coiled wires D, which extend up through the loops 4 and are there bent outwardly and made to interlock, as shown at 5. These ends are sharpened sufficiently to impale and kill the animal which is caught between them.

6 is a plate loosely fulcrumed upon a bar 7, extending transversely between the sides 3 and about midway between the ends of the trap.

9 is a trigger which serves to hold the parts in position when the trap is set. The trap is set by separating the pointed arms 5, which is done by pressing down the front end of the sides 3 until they are approximately between the sides A, and the guide-loops 4, pressing upon the pointed arms, separate them until they are drawn widely apart, as shown in the drawing. The short end of the trigger-bar is then engaged with the loop ends of the sides 3, and the other end is inserted into a hole in the plate 6, and the spring tension upon the arms 3 will hold the parts in this position. The trap may then be inserted into the burrow or hole of the animal to be caught with the pointed ends separated, and the plate 6, standing up in the line of the hole, is in position to be pushed back when the animal attempts to push out the dirt from the mouth of the hole, which is the custom of these animals. When this is done, the dirt pressing against the plate will push it back until the trigger is released, and this releasing the arms B the coil at the rear of the trap acts to throw these arms up, and the guide-loops through which the arms pass will bring them together and impale the animal.

By mounting the plate 6 upon the spring-pressed arms 3 and above the base this plate is carried upon said arms above the base, and I can thus make it as broad as is desirable, since there is nothing to interfere with it above the arms upon which it is carried.

Having thus described my invention, what I claim as new, and desire to secure by Letters Patent, is—

1. The combination in an animal-trap of wires forming a base at the rear, from the outside toward the center, thence carried forward and upward toward the front having loops attached near the bight of this portion, and other wires coiled and turnable upon the base, said wires extending through the guide-loops upon the upper portion and having their upper ends pointed, crossing each other and interlocked so that they may be separated or brought together by the action of the spring portion of the main frame, a plate fulcrumed on the forwardly-extending arms and a trigger-lever turnable on the base, having a portion to engage the bight of said arms and a second portion to engage said plate.

2. The combination in an animal-trap of a main frame consisting of a wire bent to form a base, spring-coils at one end and an operative loop extending upwardly and forwardly above the base and nearer together than the base portion, loops carried by the front end or bight of this second portion, wires extending through the loop coiled or pivoted upon the base having the upper ends sharpened, interlocked and turned outwardly so as to be separated when the trap is set and brought together when it is sprung, a plate fulcrumed transverely across the upwardly and forwardly extending arms, a trigger-lever turnable about a supporting-bar at the front of the base having a short arm adapted to engage the bight of the spring portion of the frame when the latter is depressed, and the long arm to engage a holding device upon the plate.

3. The combination in an animal-trap of a base, and an upwardly and forwardly extending portion, with an interposed coiled spring at the rear, all formed of a single wire, interlocking arms pivoted to the base, guides upon the spring-actuated portion through which said wires pass, having the upper ends interlocking, turned outwardly and pointed, a latch-plate pivoted upon the spring-pressed arms of the trap and movable therewith, and a latch-lever fulcrumed at the front having one arm adapted to engage the bight of the spring-pressed portion, and the other to engage the latching-plate.

In witness whereof I have hereunto set my hand.

ZEPHYR A. MACABEE.

Witnesses:
R. R. BELL,
BENJ. F. WILLIAMS.